Figure 1:
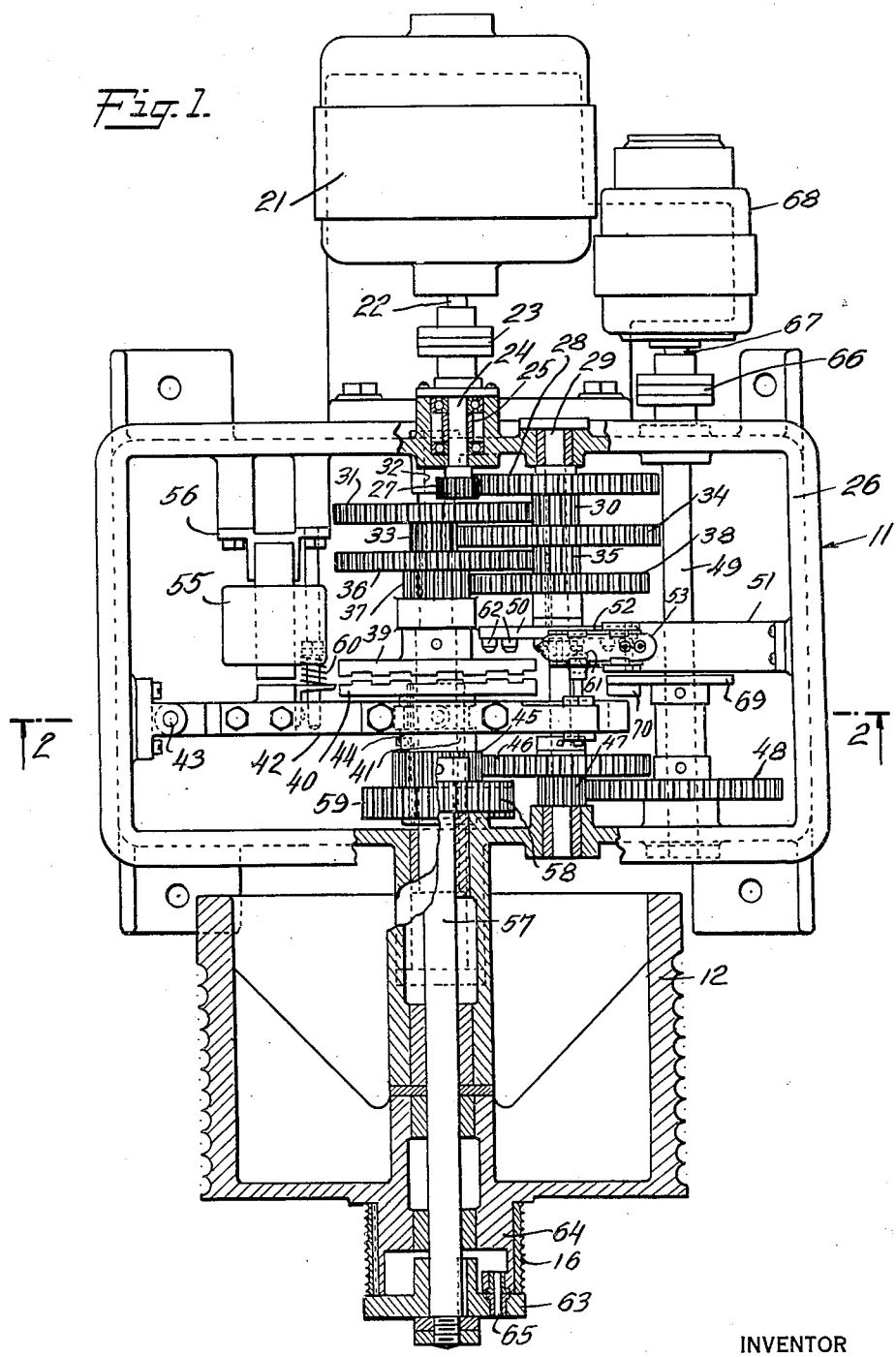

March 29, 1932. F. T. LEILICH 1,851,195
APPARATUS FOR INDICATING THE AMOUNT OF MATERIAL IN A RECEPTACLE
Filed Dec. 10, 1926 2 Sheets-Sheet 1

INVENTOR
F. T. LEILICH
BY Pennie Davis Marvin Edmonds
ATTORNEYS

March 29, 1932.   F. T. LEILICH   1,851,195
APPARATUS FOR INDICATING THE AMOUNT OF MATERIAL IN A RECEPTACLE
Filed Dec. 10, 1926   2 Sheets-Sheet 2
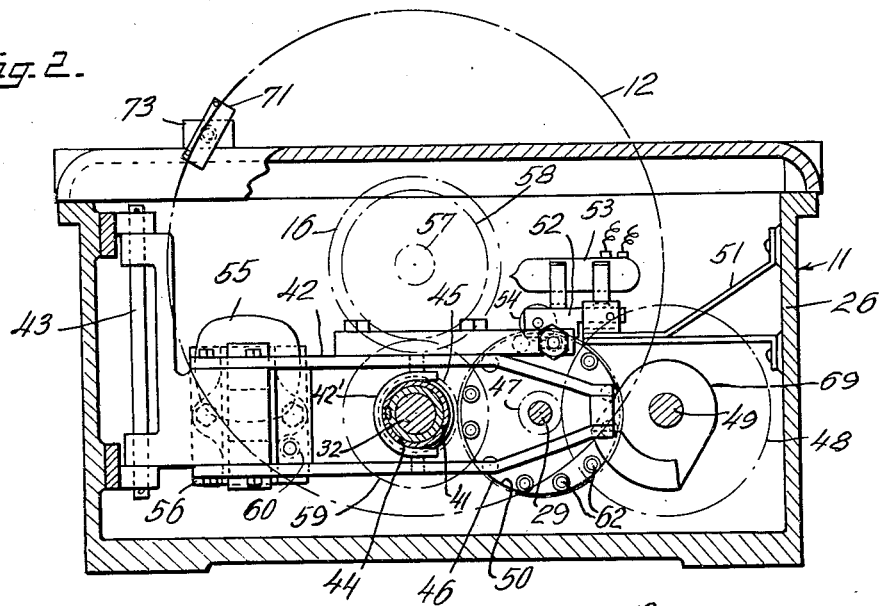
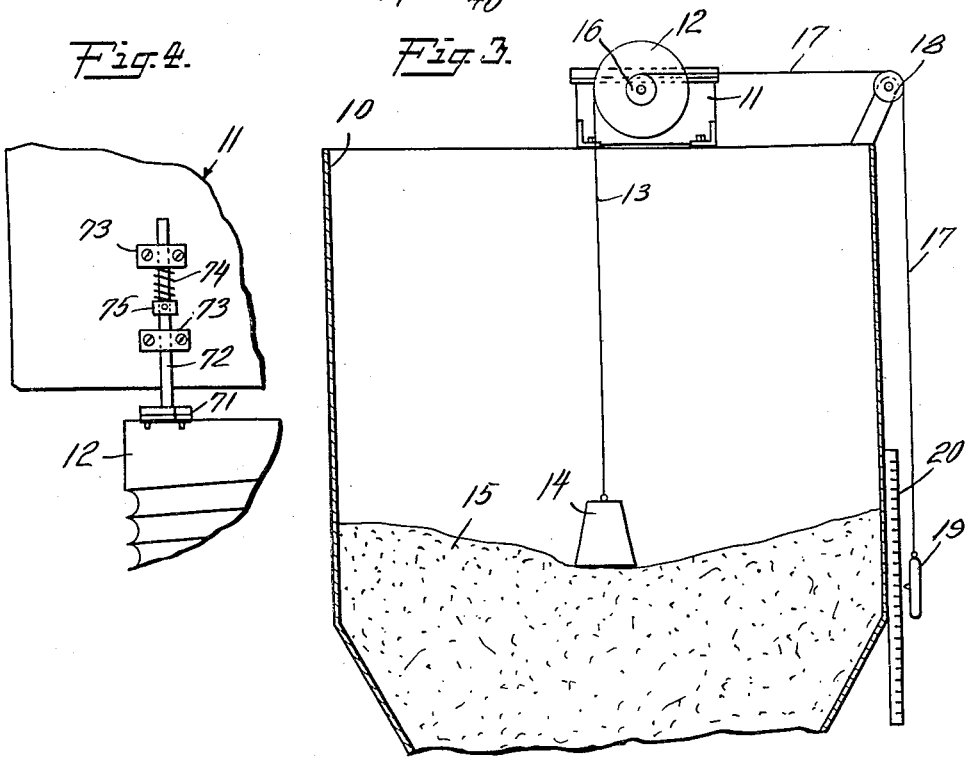
INVENTOR
F. T. LEILICH
BY Pennie Davis Marvin & Edmonds
ATTORNEYS Patented Mar. 29, 1932

1,851,195

UNITED STATES PATENT OFFICE

FRANK T. LEILICH, OF BALTIMORE, MARYLAND

APPARATUS FOR INDICATING THE AMOUNT OF MATERIAL IN A RECEPTACLE

Application filed December 10, 1926. Serial No. 154,020.

This invention relates to mechanism for controlling the supply of material to a receptacle or bin, and is concerned more particularly with a device of this type suitable for use in connection with a closed bin used for containing material which it is undesirable to expose to the atmosphere, the device being arranged to indicate the quantity or level of the material in the bin, so that an attendant may replenish the supply as it runs low. This mechanism is likewise suitable for the automatic control of supply devices, as, for example, valves, in a supply line by which the replenishment of the material in the bin may be automatically carried on as the material is discharged from the bin. The invention is of particular utility in connection with installations for burning pulverized fuel in which each burner or group of burners is provided with a supply bin and an attendant controls the operation of the burners. In that application of the invention the mechanism may simply include indicating devices which keep the attendant informed as to the quantity of the material in the bin and a form of embodiment of the invention suitable for such an installation will presently be described by way of example, although it is to be understood that the utility of the invention is by no means limited to its use in connection with indicating devices.

In installations for burner pulverized fuel, where the equipment includes a number of furnaces or burners placed at widely spaced points, it is customary to crush, dry, and pulverize the fuel at a central station and then deliver it in pulverized condition to receptacles or bins at the furnaces. From these bins the fuel is delivered to the furnace burners as required, and the operator at each furnace must be continually kept informed as to the quantity of material in his bin so that if the supply begins to run low, he can signal the central station to have additional quantities supplied him. Owing to the inflammable character of pulverized fuel under certain conditions, and the manner in which it is ordinarily conveyed, it is desirable that the bins in which it is stored at the furnaces should be kept closed and the indicating apparatus used should be arranged so that it may be operated in connection with such a bin without the necessity of exposing the fuel in the bin to the atmosphere. Also, unless this indicating device gives accurate readings, the operator may be misled as to the supply of fuel available so that the supply may become exhausted before it can be replenished and the furnace may have to be shut down temporarily.

Signal indicators for this same general purpose are now in use and they frequently include a paddle or other contact member which bears against the surface of the material in the bin, and assumes different positions as the level of the material rises or falls. This paddle or float is connected to transmitting means by which an indication is given outside the bin at a point where it is visible to the operator. Paddles or floats of this type as now used are not entirely satisfactory for indicating the condition in a bin which contains a finely divided material, because the material has a tendency to pack together and arch, so that there may be a large hollow space within the mass of material with a thin bridge across it. The paddle resting on the top of this bridge will indicate that the bin contains a much larger quantity of material than is actually the case, and this erroneous reading is likely to cause an interruption of the supply of fuel to the burner. Any gravity float or paddle of this type is therefore open to serious objection. Also, with a float type of indicating device, it is necessary to employ a number of floats and signal devices corresponding to different heights of material in the bin. Frequently there is a low level indicator and a high level indicator, and the operator cannot ascertain the quantity of material in the bin, except when the level reaches the high or low point. Such a system, therefore, has serious disadvantages.

The present invention is directed to the provision of control apparatus which may be used in connection with a bin which it is desired to keep practically closed, and may include a bin level indicator so arranged that errors in the readings are substantially avoided. The apparatus includes a member or float which lies within the bin and normally rests on the level of the material therein, but this float is repeatedly raised above the material and allowed to fall thereon, so that it is periodically reset throughout its operation. This resetting prevents any error in the reading due to sticking of the mechanism, and as the float is raised mechanically and then allowed to fall with considerable force upon the material, it operates to break down or collapse any arch or bridge which is forming in the material, and likewise is kept from being embedded as additional material is supplied to the bin. Accordingly, the operator is continuously informed as to the true condition in the bin and difficulties due to a depletion in the supply of which he is not aware are avoided. The apparatus is arranged to give an indication at the bin itself and it includes means by which this indication may be transmitted to a remote point, as, for example, to the central supply station.

In one form of embodiment of the invention, the apparatus includes a motor which runs continuously and is mounted at any convenient place, as, for instance, on the top of the bin. Driven by the motor is a cable drum on which is wound a cable leading through an opening through the top of the bin and carrying a weighted float on its lower end. The motor shaft leads through a housing, within which is mechanism periodically operated by the motor and controlling a clutch through which the drum is driven by the motor. The rotation of the drum causes the cable to be wound up, thus lifting the float above the surface of the material, and when the float has reached a suitable point above the level of the material, the clutch is disconnected and the cable is wound off the drum by gravity acting on the float, causing the float to fall rapidly and strike the material. Connected with the drum is another drum, over which runs a cable leading to an indicating device disposed at any convenient point, and this indicating device includes a pointer which takes a postion with reference to a scale dependent on the position of rest of the float. With this arrangement, the periodical raising and lowering of the float insures that the float will not become embedded in the material, due to the feeding of additional quantities into the bin, and further prevents bridging or arching.

In addition to the features above mentioned, the apparatus includes many others which will be described in detail hereafter, such, for example, as the means for transmitting an indication of the condition in the bin to a remote point, and means for preventing the accidental contact of the float with the top of the bin as the cable is being wound up.

For a better understanding of the invention, reference may be had to the accompanying drawings, in which Fig. 1 is a top plan view of the mechanism with certain parts broken away and others shown in section, Fig. 2 is a sectional view of the mechanism on the line 2—2 of Fig. 1, Fig. 3 is a diagrammatic view of the mounting of the device and its mode of operation, and Fig. 4 is a plan view of a detail.

Referring now to the drawings, the device is shown in Fig. 3 in operative position on a bin 10. The apparatus includes a casing 11, through which extends a shaft carrying a drum 12 on which is wound a cable 13, the free end of which carries a weighted float 14. The cable 13 passes through an opening in the top of the bin and the float 14 normally lies in contact with the level of the material 15 within the bin. Mounted on the same shaft with the drum 12 is another drum 16, on which is wound a cable 17 leading around a guide wheel 18 to an indicator disposed at any convenient point. As illustrated, the indicator includes a weighted pointer 19 which moves over a calibrated scale 20 which may be secured at any convenient point where it may be seen by the attendant, as for instance, it may be attached to the side wall of the bin. In the operation of the device, the drum 12 is periodically rotated to wind up cable 13 and lift the float 14 to a point above the level of the material. The drum is then released and the float falls to a position of rest on top of the material. The cable 17 is wound off and on its drum as the float is raised and lowered, and when the float comes to its position of rest on the material, the weighted pointer assumes a position with reference to the calibrated scale which indicates the quantity of material which the bin contains.

The mechanism by which the float is periodically raised and lowered may take different forms, but one suitable type includes a motor 21 mounted on the top of the bin and having a shaft 22 carrying part of a flexible coupling 23 to which is secured a shaft 24, journaled in a suitable bearing assembly 25 in the wall of the housing 26. On the end of the shaft 24 is a pinion 27, driving a gear 28 on a shaft 29 lying within the housing. The gear 28 is loose on shaft 29, but rigidly secured to a pinion 30 driving gear 31 on shaft 32 journaled in the housing. The gear 31 is loose on shaft 32 but fast to a pinion 33 on the shaft which drives a gear 34 on shaft 29. The gear 34 drives a pinion 35 on shaft 29 which in turn drives a gear 36 keyed to shaft 32. The shaft 32 carries a pinion 37 keyed on it and driving a gear 38 keyed to shaft 29. The shaft 32 carries a driver member 39 of a clutch secured to it. Associated with the driver member 39 is a driven clutch member 40 mounted on a sleeve 41 by its extension 44. In the extension is a channel in which lies a U-shaped member 42' pivoted to a yoke member 42. The yoke is mounted on a pin 43 in the side of the housing and may be swung on its pivot to cause the members of the clutch to become engaged. The rotation of the clutch member 40 causes sleeve 41 to rotate and secured to this sleeve is a pinion 45 driving a gear 46 which is freely mounted on shaft 29 and rigidly connected to a pinion 47 driving a gear 48 on shaft 49 journaled in the wall of the casing 26.

The periodic operation of the clutch may be performed by various devices, electric mechanism being here illustrated by way of example. Mounted on the shaft 29 beyond the gear 38 is a cam plate 50 and disposed on a bracket 51 secured to the side wall of the casing is a pivotally mounted frame 52, carrying a mercury contact switch 53. This frame carries a roller 54 bearing against the cam and as the cam is rotated, the mercury contact switch is caused to tilt, establishing an electrical circuit, not illustrated, by which it energizes an electromagnet 55 secured to a bracket 56 within the casing wall. This electromagnet, when energized, causes the yoke 42 to be swung on its pin to bring the two members of the clutch into engagement, thus causing the pinion 45 to be driven. Disposed on a shaft 57 directly above the shaft 32 and journaled in the housing, is a gear 58 keyed to the shaft 57 and driven by a gear 59 on the sleeve 41. The shaft 57 extends out through the wall of the housing and carries the cable drum 12. Accordingly, when the electromagnet is energized by the tilting of the mercury contact switch, the drum 12 is driven to wind up cable 13 and lift the float 14.

When the drum 12 has been rotated to wind up the cable for a suitable distance, the mercury contact switch is allowed to tilt back, disengaging the electromagnet, but as the pressure on the clutch may be sufficiently heavy to prevent its being freely disengaged by means of the abutment spring 60 which the yoke 42 compresses when the clutch is engaged, the end of the yoke is provided with a roller 61 bearing against the side of the cam plate 50 and struck by lugs 62 thereon as the plate rotates. This forces the clutch out of engagement so that the drum may rotate freely under the drag of the cable.

The drum 12 fits freely on the end of the shaft 57 but is secured thereto by means of a plate 63 keyed to the shaft and connected to an extension 64 on the end of the sheave by means of a shear pin 65. This extension 64 may be provided with a channeled surface forming the drum 16 over which runs the cable 17 leading to the weighted pointer movable along the side of the bin.

It will be noted that the series of pinions and gears 27, 28, 30, 31, 33, 34, and 36 provide a speed reduction so that the motor 21 may run at a high speed without causing a too rapid rotation of the drum and of the cam plate. The pinion 45, gear 46, pinion 47, and gear 48 provide a further reduction so that although the drum 12 is rotated a sufficient number of times whenever the clutch is engaged to raise the weight a considerable distance above the level of the material, the shaft 49 may rotate through an angle less than 360°. The shaft 49 operates a commercial transmitting and indicating mechanism to give a remote indication, as by means of a pointer moving over a dial and preferably the movement of the pointer should be less than 360°. This shaft 49 is connected through a coupling 66 to the shaft 67 of the transmitter 68 for the remote indicating mechanism. This mechanism may be of any well-known commercial type for the purpose, such as the Selsyn motor which is arranged so that its shaft may be set to different angular positions and upon thus being set, the transmitter causes the shaft of a position indicator at a distance therefrom to assume a similar angular position. In the device illustrated, when the clutch is engaged and the drum 12 is winding up its cable, the shaft 49 is driven in one direction, causing the indicator at the remote point to move rearwardly along its scale. Then, when the weight is allowed to fall freely, the rotation of the drum in the reverse direction causes a similar rotation of shaft 49, the shaft coming to rest at a position dependent upon the height of the material in the bin, and thus causing the remote indicator to assume a proper position with relation to its scale. If desired, the circuits employed for the remote indicating device may include means to cut off the indicator current supply during the movement of the float, the remote indicator then assuming a position dependent on the position of the float only after the latter is at rest. Since this shaft 49 is connected directly to the drum, its angular position therefore represents correctly the position of the float with reference to the top of the bin and it may therefore be used as a suitable means for limiting the upward travel of the float. This means includes a cam 69 mounted on shaft 49 and provided with a projection 70. When the rotation of the shaft 49 approaches its limit in one direction, the cam 69 is moved about to a position in which its lug 70 strikes one end of the yoke 42, thus moving the yoke so as to disengage the clutch if the latter is in mesh at a time when it should be disconnected. This is a positive safe-guard and prevents the clutch from remaining in engagement sufficiently long to cause the float to be drawn up against the top of the bin. In order to prevent overrunning of the drum when the float is falling, a brake is employed consisting of a brake shoe 71 carried on a rod 72 mounted in straps 73 on top of the casing 11. The shoe 71 bears against the edge of the drum and is pressed in contact therewith by means of a spring 74 bearing at one end against a collar 75 on the rod 72 and at the other against one of the straps 73.

It will be seen that the new indicating device is thoroughly satisfactory for use in connection with a bin which it is desired to keep closed because the device may be mounted on the outside of the bin and the only opening required is that through which the float cable passes. Due to the fact that the float is periodically raised and released, the float cannot be buried by material being introduced into the bin so that the indicator will show that the bin contains less material than is actually the case. Similarly, the periodical raising and dropping of the float prevents building up or arching of the material, which would cause the indicator to show a greater quantity of material than the bin really contained. The apparatus thus gives accurate readings, and these readings are available both at the bin itself and for transmission to a remote point. With such an apparatus, accordingly, each operator may know the contents of his bin accurately at all times and the operator at the central station may likewise be kept informed so that he can supply material to any bin in case the operator at the bin is inattentive.

While the apparatus has been illustrated in a form suitable for giving an indication at a point near the bin as to the quantity of material contained in the bin, it is apparent that the mechanism may be used to control valves which govern the supply of material to the bin in association with an indicating device, or these valves may be controlled alone and without the use of indicating mechanism. Likewise, while the apparatus has been illustrated as including electromagnetic means for operating the clutch which periodically causes the float to be raised, it is apparent that mechanical means may be used for this purpose and furthermore instead of using the electrical transmitter illustrated for the purpose of transmitting the indication to a remote point, various other forms of mechanism may be used for the purpose. The electrical transmitter here described is of a standard type available in commercial form but it is not intended that the invention be limited to that mechanism as it is evident that various other suitable means may be substituted for it.

I claim:

1. In apparatus of the type described, the combination of a float normally resting on top of the material in a bin, a cable connected to the float, a drum on which this cable may be wound, a mounting for the drum, a motor, a clutch between the motor and the drum, a cam driven by the motor to control the clutch for periodically connecting the motor and the drum to cause the motor to rotate the drum to wind up the cable and raise the float and thereafter disconnecting the motor and drum, permitting the float to unwind the cable from the drum and return into contact with the material, and an indicating device operated by the drum and having a part which assumes a position of rest determined by the position of rest of the float on top of the material.

2. In apparatus of the type described, the combination of a float normally resting on top of the material in a bin, a cable connected to the float, a drum on which the cable may be wound, a mounting for the drum in which the latter is freely rotatable, a motor, a cam driven by the motor, cam-controlled means for periodically connecting the motor and drum to cause the motor to rotate the drum to wind up the cable thereby raising the float clear of the material, the said means thereafter disconnecting the motor and drum to permit the float to unwind the cable from the drum and fall into contact with the material, and an indicating device operated by the drum and having a part movable to different positions of rest corresponding to those assumed by the float when it lies on top of the material.

3. The combination of a float normally resting on top of the material in a bin, a cable connected to the float, a drum on which the cable may be wound, a mounting for the drum in which the latter is freely rotatable, a motor, a clutch for connecting the motor and drum whereby the motor rotates the drum to wind up the cable, means driven by the motor for periodically engaging and disengaging the clutch, and an indicating device having a part actuated by the movements of the drum and assuming different positions of rest corresponding to those assumed by the float when on top of the material.

4. The combination of a float normally resting on top of the material in a bin, a cable connected to the float, a freely rotatable drum on which the cable may be wound, a mounting for the drum, a continuously rotating motor, a clutch for connecting the motor and drum, whereby the motor rotates the drum to wind up the cable, means driven by the motor for periodically engaging and disengaging the clutch, and an indicating device having a part operatively connected to the drum and assuming different positions of rest corresponding to those assumed by the float when on top of the material.

5. The combination of a float normally resting on top of the material in a bin, a cable connected to the float, a drum on which the cable may be wound to raise the float, a mounting for the drum, a motor, a clutch by which the motor may be connected to the drum to rotate the latter to wind up the cable, electromagnetic means for engaging the clutch, means operated by the motor for rendering the electromagnetic means effective to engage the clutch, motor driven means for disengaging the clutch whereby the cable is unwound from the drum by the action of the float, and an indicating device having a part operated by the drum in accordance with the movements of the float and assuming different positions of rest determined by the latter.

6. The combination of a float normally resting on top of material in a bin, means for raising the float clear of the material, said means including a driving connection for the float, a motor, means operated by the motor for connecting and disconnecting the driving connection from the float, a shaft movable in accordance with the movements of the float and having different angular positions of rest corresponding to the positions of rest of the float in contact with the material, and a device at a distance from the bin and having a visible part operatively connected to the shaft and assuming positions of rest corresponding to the positions of rest of said shaft.

7. The combination with a bin of a casing disposed thereon, a motor having a shaft a part of which lies within the casing, a drum mounted for rotation outside the casing, a float adapted to rest on top of material in the bin and having a cable connected thereto adapted to be wound on the drum, a clutch within the casing for connecting the motor and drum, whereby the motor drives the drum to wind up the cable, means within the casing driven by the motor for periodically engaging and disengaging the clutch, and a device at a distance from the casing having a visible part operatively connected to the drum and assuming positions of rest corresponding to the positions of rest of the float in contact with the material.

8. The combination with a bin of a casing mounted above the bin, a motor having a shaft a part of which lies within the casing, a drum freely rotatable, a mounting for the drum, a second shaft forming part of said drum mounting and entering said casing, a float within the bin adapted to rest on top of material therein, a cable connected to the float and adapted to be wound on the drum by the rotation of the latter, a clutch within the casing for connecting the motor shaft and the drum shaft, a cam driven by the motor, electromagnetic means within the casing periodically rendered effective by the cam for engaging and disengaging the clutch, a position-indicating shaft within the casing movable in correspondence with the rotation of the drum and assuming positions corresponding to the positions of the float in contact with the material, and an indicating device at a distance from the casing and connected to the position-indicating shaft so as to be driven thereby, this device having a part assuming positions corresponding to the positions of said position-indicating shaft.

9. The combination of a closed bin adapted to contain material, a float within the bin adapted to rest on top of the material, a cable connected to the float and passing through an opening in the top of the bin, a freely rotatable drum on which the cable may be wound, a mounting for the drum, a casing on top of the bin, a motor having a shaft extending into the casing, driving means for the drum extending through the casing wall, a clutch within the casing for connecting the said driving means and the motor, electromagnetic means within the casing for engaging the clutch, motor-driven variable motion means within the casing for rendering the electromagnetic means periodically effective, means within the casing and driven by the motor for periodically disengaging the clutch, a second drum rotatable with the first, a cable adapted to be wound off and on the second drum, a scale, and a member connected to the cable of the second drum and movable over the scale in accordance with the movements of the drum.

10. In apparatus for indicating the level of material in a bin, the combination of a float adapted to rest on top of the material, means for raising the float, said means including a driving connection to the float, a motor, a clutch for connecting the motor and the said driving connection and means driven by the motor for periodically engaging the clutch; and stop means for disengaging the clutch to limit the extent of raising movement of the float.

11. In apparatus of the type described, the combination of a member normally resting in contact with the material in a bin, means for raising the member clear of the material, said means including a motor, driving connections between the motor and said member, and a variable motion device driven by the motor for disconnecting said member from said motor, whereby the member falls by gravity to re-engage the material in the bin; and a visual indicator driven by said means in accordance with the movement of the member.

12. In apparatus of the type described, the combination of a member normally resting in contact with material in a bin, a motor, means actuated by the motor to raise the member clear of the material, said means including a variable motion device for disconnecting the means from the motor when the member reaches a predetermined high position whereby it falls by gravity into contact with the material; and a remote indicator connected to said means so as to be driven in accordance with the movements of the member.

13. In apparatus of the type described, the combination of a member normally resting in contact with the material in a bin, a motor, means actuated by the motor to raise the member clear of the material, said means including a variable motion device driven by the motor, a clutch connecting said member to said motor and mechanism controlled by the device for operating said clutch to disconnect the member from the motor when the latter reaches a predetermined high position determined by the device to allow the member to fall into contact with the material; and a remote indicator connected to said means so as to be driven in accordance with the movements of the member.

14. In apparatus of the type described, the combination of a member normally resting in contact with the material in a bin, means for raising the member out of contact with the material and allowing it to fall to its position of contact with the material, said means including a variable motion device, mechanism for actuating the member, continuously operating power driven means and driving connections between said mechanism and said member controlled by said device to periodically move the member in one direction and releasing it to fall by gravity in the other direction; and a second device operated by said means and having a visible part assuming a position of rest corresponding to that assumed by the member in contact with the material.

15. In apparatus of the type described, the combination of a float normally lying within a bin in contact with the material therein, means for raising the float clear of the material, said means including a cable connected to the float, a drum on which the cable is wound, a motor for driving the drum, a cam, and mechanism driven by the motor and controlled by the cam for periodically connecting and disconnecting the motor and said drum, whereby the latter is driven by the motor to raise the float clear of the material and then is rendered inoperative, permitting the float to fall; and an indicating device driven by said means in accordance with the movements of the float and having a part which assumes a position of rest determined by the position of the float when the latter is on top of the material.

In testimony whereof I affix my signature.

FRANK T. LEILICH.